(12) United States Patent
Belloso

(10) Patent No.: US 7,270,030 B1
(45) Date of Patent: Sep. 18, 2007

(54) TRANSMISSION WITH MULTIPLE INPUT PORTS FOR MULTIPLE-ENGINE VEHICLES

(76) Inventor: Gregorio M. Belloso, 5302 Chinaberry Dr., Salisbury, MD (US) 21801

(*) Notice: Subject to any disclaimer, the term of this patent is extended or adjusted under 35 U.S.C. 154(b) by 236 days.

(21) Appl. No.: 11/096,101

(22) Filed: Apr. 1, 2005

(51) Int. Cl.
*F16H 37/06* (2006.01)
(52) U.S. Cl. .......................................... 74/661; 74/664
(58) Field of Classification Search .................. 74/661, 74/665 R, 664
See application file for complete search history.

(56) References Cited

U.S. PATENT DOCUMENTS

| | | | |
|---|---|---|---|
| 2,527,424 A | | 10/1950 | Johansson |
| 2,707,618 A | * | 5/1955 | Brown ........................ 74/661 |
| 2,893,495 A | * | 7/1959 | McDowall et al. ........... 244/60 |
| 3,370,484 A | * | 2/1968 | Lovercheck ................. 74/661 |
| 3,872,675 A | * | 3/1975 | Amiot ........................ 60/718 |
| 4,439,989 A | | 4/1984 | Yamakawa |
| 4,481,841 A | * | 11/1984 | Abthoff et al. ............... 74/661 |
| 4,829,850 A | * | 5/1989 | Soloy ........................ 74/665 B |
| 5,215,174 A | * | 6/1993 | Heidenreich ............... 192/45.1 |
| 5,398,508 A | * | 3/1995 | Brown ........................ 60/718 |
| 6,179,078 B1 | | 1/2001 | Belloso |
| 6,637,283 B2 | | 10/2003 | Belloso |

* cited by examiner

*Primary Examiner*—Tisha Lewis
(74) *Attorney, Agent, or Firm*—Norman B. Rainer

(57) ABSTRACT

An improved transmission system is provided for an automotive vehicle having multiple engines for reason of fuel economy, including primary and secondary internal combustion engines separately supplied with fuel and having crankshafts in parallel orientation and terminating in co-directionally rotating flywheels. The improved transmission system includes a clutch mechanism associated with the flywheels for controllably transferring rotary force axially to input shafts in spaced apart parallel relationship and coupled by a power transfer mechanism. A sprag clutch is interactive between the secondary input shaft and the power transfer mechanism. A main gear, driven by the power transfer mechanism, is located within a gear box having speed change gears.

13 Claims, 10 Drawing Sheets

TRANSMISSION WITH MULTIPLE INPUT PORTS FOR MULTIPLE-ENGINE VEHICLES

BACKGROUND OF THE INVENTION

1. Field of the Invention

This invention relates to the power train of an automotive vehicle for transmitting power from the engine to the driving wheels, particularly to that part of the power train known as the speed change transmission, and more particularly to speed change transmissions capable of receiving power from more than one power source.

2. Description of the Prior Art

The rising cost of automotive fuel has created a need for means for improving the fuel efficiency of automotive vehicles. Various solutions have been proposed.

One solution has been the hybrid automobile which uses an electric motor powered by batteries together with an internal combustion engine. It uses both the engine and the electric motor to provide sufficient combined power to accelerate and climb, etc., and then uses either the engine or the electric motor to travel economically at cruising speeds. The engine generally provides the power for recharging the batteries, so that in reality substantially all the power is provided by the automotive fuel.

Such hybrid systems are of high cost and complexity. The batteries can cost up to $5000.00 per vehicle, and have a limited service life of approximately 80,000 miles. The electric motor, electric generator and the necessary power transmission and control system as well as the means for integrating their function with that of the internal combustion engine result in additional high manufacturing and maintenance costs.

Another proposed approach for improving fuel economy is the use of two or more engines in one vehicle. All the engines are operated to produce enough power for acceleration, climbing, etc., and only one engine is used to maintain cruising speed for economical long distance travel.

U.S. Pat. No. 6,179,078 to Belloso discloses a fuel efficient and inexpensive automobile having two engines coupled to drive wheels by way of a continuously variable ratio torque converter. The vehicle uses both engines for quick acceleration, then uses either engine for economical cruising. A disadvantage of this system is the limited power capacity and limited speed range of current continuously variable ratio torque converters.

U.S. Pat. No. 6,637,283 to Belloso discloses a Control Apparatus for a Continuously Variable Transmission for extending the drive ratios and versatility of the CVT. It increases its operational speed range, provides reverse functionality and has the capacity to accommodate two different power sources. Its disadvantage is that most currently available continuously variable transmissions, particularly those using variable-pitch pulleys, have only limited power handling capacity, especially when compared to the standard manual and automatic transmissions that are in general use in automotive vehicles today. This control apparatus is not readily adaptable for use in these standard manual and automatic transmissions.

U.S. Pat. No. 4,439,989 to Yamakawa discloses a system with at least two engine units, a primary engine unit and an auxiliary engine unit, each coupled to a transmission through an electromagnetic power clutch. It is equipped with means for operating the two engines in a proper phase difference of, preferably, 180 degrees to prevent unwanted vibrations. A problem with this engine is the high complexity of the system used to make the engine units run at the specified proper phase difference between the engine units.

Another disadvantage is that it does not readily lend itself to the use of dissimilar engine units, particularly units that differ in their optimal operating speeds. Furthermore this patent does not teach any improvement or modification of the standard manual or automatic transmissions to facilitate fuel savings.

Although improved fuel efficiency can be achieved through the use of a smaller fuel-efficient engine in an automobile, particularly for maintaining cruising speed, additional power is required for acceleration and hill climbing. Modified engine systems of the prior art have not proved truly satisfactory, either because of their excessive cost and complexity, or because of reliance upon continuously variable torque converters having inadequate power handling capacity.

There is, therefore, a need for an engine system which will not only permit selective use of power from a plurality of engines but will also make use of currently available standard manual or automatic transmissions, and take advantage of their proven versatility, reliability, durability and power-handling capacity.

It is accordingly a primary purpose of this invention to provide an automotive transmission equipped with multiple input ports for receiving power from a plurality of power sources and further equipped with means for selectively transmitting power from said sources to a common output shaft for eventual transmission to the driving wheels.

It is a particular object of this invention to provide an automatic transmission equipped with multiple input ports and adapted to receive power from multiple internal combustion engines.

It is also an object of this invention to provide a manual transmission equipped with multiple input ports for receiving power from multiple engines.

It is a further purpose of this invention to provide a transmission capable of receiving power from multiple power sources of dissimilar types, dissimilar operating speeds and dissimilar power output.

It is a further purpose of this invention to provide a fuel-efficient automotive vehicle equipped with two or more internal combustion engines, said vehicle being capable of selectively using the combined power of a plurality of said engines for acceleration, climbing, etc., and capable of selectively using power from a lesser number of said engines for economical travel.

It is yet another object of this invention to provide an automotive vehicle of the aforesaid nature that employs the currently generally used types of automatic or manual transmissions with a minimum of modifications of said transmissions.

It is a still further object of this invention to provide an automotive vehicle of the aforesaid nature wherein the additional power from the second (and third, etc.) engine/power source will be automatically engaged and disengaged, as needed, without requiring the operator to make substantial changes in the manner in which he regularly operates an automotive vehicle, hence without requiring him to have to upgrade his skill as an operator of motor vehicles.

These objects and other objects and advantages of the invention will be apparent from the following description.

SUMMARY OF THE INVENTION

The above and other beneficial objects and advantages are accomplished in accordance with the present invention by an improved manual or automatic speed change transmission capable of receiving power from multiple internal combustion engines, or other power sources, and transmitting their combined power to a common output shaft; said transmission being further capable of selectively disengaging any of said engines to maximize fuel economy, said improvements comprising:

a) in a manually operated embodiment of said transmission, releasable coupling means such as a frictional clutch interactive with rotary power output means of each engine to transfer power axially to an associated transmission input shaft, b) power transfer means for transferring power laterally between said input shafts, and comprised of an endless chain connected to sprockets, or spur gears, or combinations thereof, c) an over-riding sprag clutch disposed between one or more of said input shafts and said power transfer means, and d) a main shaft driven by said power transfer means and extending into a gear box having speed change gears, whereby e) power from each power source is conveyed to each corresponding transmission input shaft through said releasable coupling, thence through said power transfer means through said sprag clutch to said main shaft, thence through conventional speed change gears.

In an automatically operated embodiment of the improved transmission of this invention, said releasable coupling means are fluid couplings such as a torque converter, and the speed change gears are those of a conventional automotive automatic transmission.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

For clarity of illustration, details which are not relevant to the invention, such as shift levers, clutch pedals and linkages, multiple speed change gears inside the gearbox, planetary gears, brakes and clutches inside the automatic transmission housing have been omitted from these drawings.

DESCRIPTION OF THE PREFERRED EMBODIMENT

Figure 1:
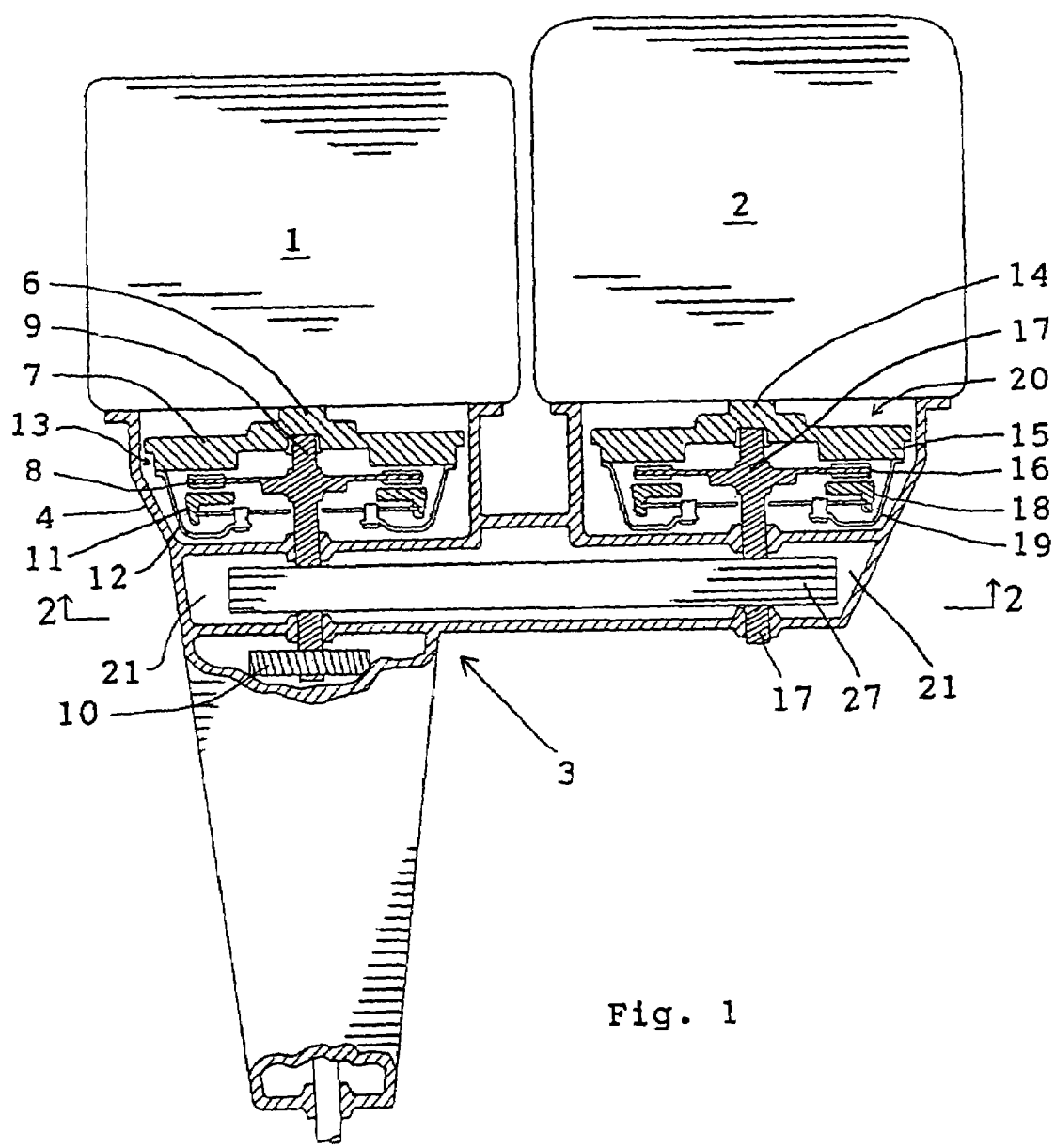
FIG. 1 is a top view partly in section, of a manually operated embodiment of the transmission of this invention shown in operative association with two internal combustion engines.
Figure 2:
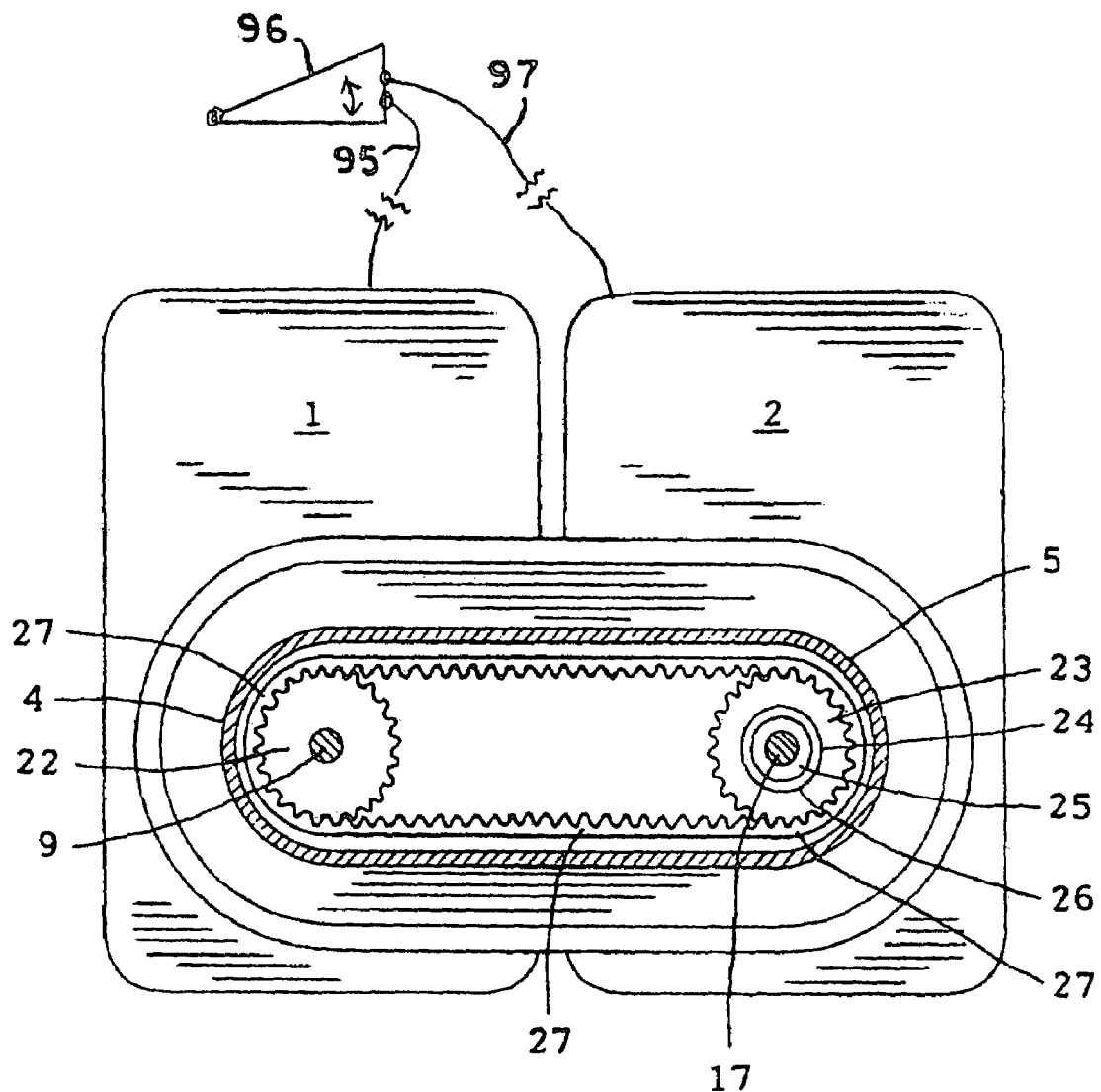
FIG. 2 is a sectional view taken in the direction of the arrows upon the line 2-2 of FIG. 1 and further showing symbolic representation of a gas pedal and fuel supply lines.

Referring now to FIGS. 1 and 2, there is shown a primary engine 1 and a secondary engine 2 in operative association with manual transmission 3 embodying this invention. Primary engine 1 is fixedly bolted to left bell housing 4 of transmission 3, while secondary engine 2 is fixedly bolted to right bell housing 5 of transmission 3. Power from engine 1 is transmitted from its crankshaft 6 to its flywheel 7 positioned within bell housing 4. Also located within bell housing 4 is primary clutch assembly 13 in axial alignment with flywheel 7. Said clutch assembly is comprised of cover 12 attached to said flywheel, primary clutch plate 8 attached to primary input shaft 9 and pressure plate 11 adapted to interact with primary clutch plate 8. Input shaft 9 extends through bell housing 4 to transmission main gear 10. Accordingly, when pressure plate 11 interacts with clutch plate 8, power is delivered from engine 1 to transmission main gear 10.

Power from secondary engine 2 is transferred from its crankshaft 14 to its flywheel 15 positioned within bell housing 5. Also located within bell housing 5 is secondary clutch assembly 20 in axial alignment with flywheel 15. Said secondary clutch assembly is comprised of cover 19 attached to flywheel 15, secondary clutch plate 16 attached to secondary input shaft 17, and secondary pressure plate 18 adapted to interact with plate 16.

Aside from having two clutch assemblies 13 and 20, another fundamental novel feature of this invention is that left bell housing 4 and right bell housing 5 are fixedly integrated into one unit, either by being cast in one piece or by being fixedly bolted together. Furthermore, left bell housing 4 and right bell housing 5 include a common power transmission chamber 21 which is traversed by both the primary input shaft 9 and the secondary input shaft 17, which are both journaled to the walls of chamber 21.

A driven sprocket wheel 22 is fixedly mounted on primary input shaft 9 within chamber 21. A drive sprocket wheel 23 is releasably mounted on secondary input shaft 17 through sprag clutch 24. The inner race 25 of sprag clutch 24 is fixedly mounted on secondary input shaft 17 while the outer race 26 of said sprag clutch is fixedly mounted on drive sprocket wheel 23. Driven sprocket wheel 22 is interactive with drive sprocket wheel 23 by way of a positive drive means embodied by gearing chain 27, said assembly constituting a power transfer mechanism.

Sprag clutch 24 may be any suitable design of the various types of sprag clutches currently available. A sprag clutch consists of an inner race disposed within an outer race having a plurality of shaped parts known as "sprags" lodged in cam-shaped cavities in the annulus between the races. Sprag clutches automatically engage when the r.p.m. of the inner race is caused to equal or exceed the r.p.m. of the outer race.

Primary engine 1 and secondary engine 2 are disposed so that their crankshafts 6 and 14 turn in the same direction. Primary clutch assembly 13 and secondary clutch assembly 20 are actuated by one clutch pedal and are connected and adjusted in such a manner that they both release at essentially the same time when the clutch pedal is depressed and that they both engage at essentially the same time when the clutch pedal is released, even if the clutch pedal is released fairly gradually.

Fuel supply line 95 for primary engine 1 is connected to the gas pedal 96 in the conventional manner and is controlled by the operator in the conventional manner. Fuel supply line 97 to secondary engine 2 is connected via a controllably releasable linkage to the same gas pedal as well, so that when increased power is needed, such as when the vehicle is accelerating or climbing a grade, both engines may be operated to produce the required power by depressing the gas pedal. Means are provided, however, to selectively disconnect the fuel supply to secondary engine 2 when less power is needed, such as when cruising on a level highway. This means may be an electrically actuated device which may be manually switched on or off by the operator with a switch at a convenient location.

Alternatively, the means for connection or disconnection of the fuel supply for secondary engine 2 to the gas pedal may be controlled automatically in various ways. One way is for the said electrically actuated connecting device to remain connected when the transmission is on first, second or even third gear, and for said connecting device to be automatically disconnected when the transmission is on top gear or on overdrive. For further automatic versatility, means may be added to override the above-stated disconnection (when the transmission is in top gear or overdrive) when the gas pedal is depressed to a preset degree, signaling a call for increased power, such as for passing or climbing at high speed, to permit use of both engines simultaneously even when the transmission is set at top gear or overdrive. A further alternative may be to use "load sensors" or "torque sensors" to determine if additional power is needed from secondary engine 2, and use signals from said sensors to override the above-stated disconnection of engine 2 from the gas pedal even when the transmission is on top gear or overdrive.

Figure 3:
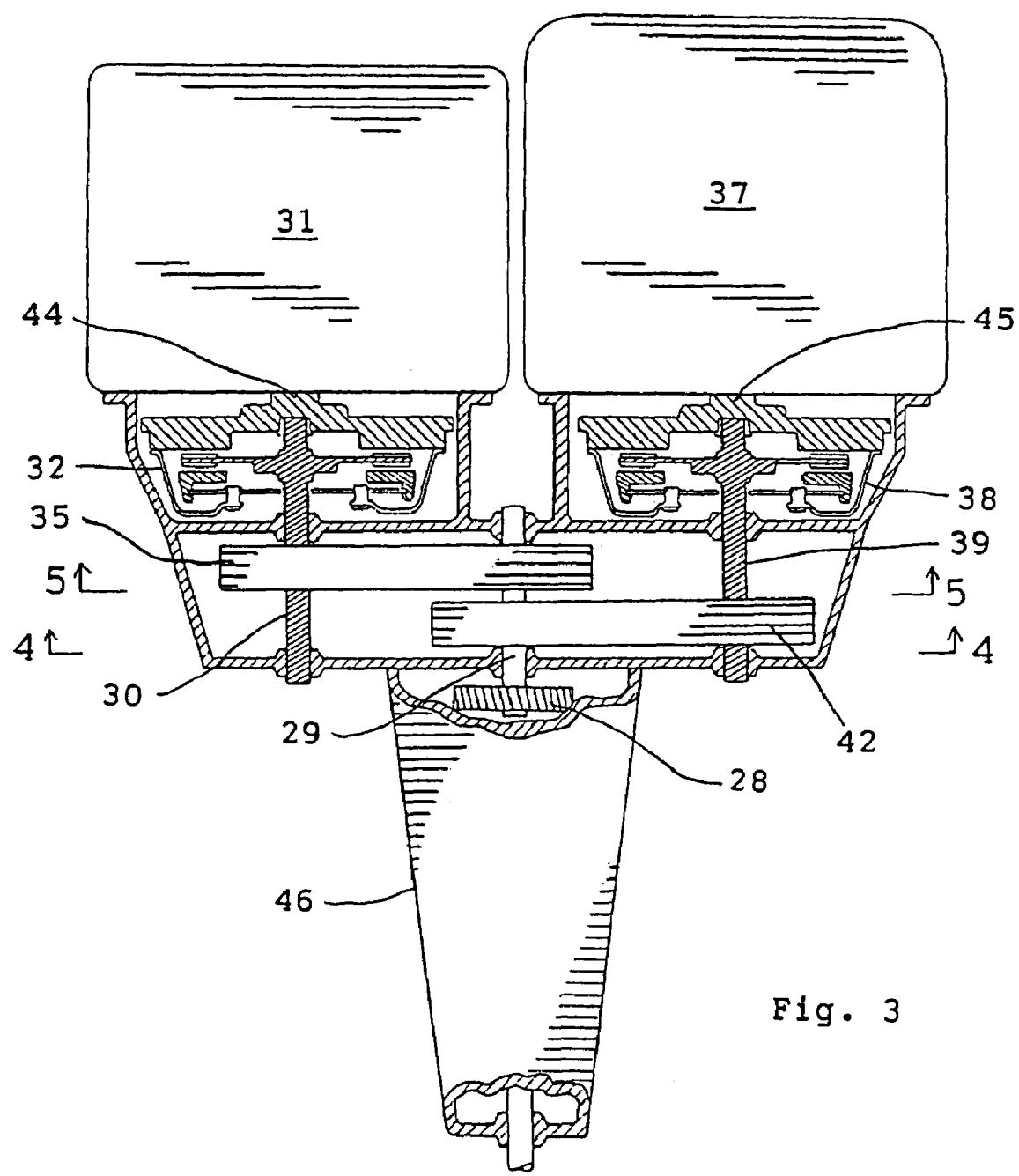
FIG. 3 is a top view, partly in section, of an alternative manually operated embodiment of the transmission of this invention shown in operative association with two internal combustion engines.
Figure 4:
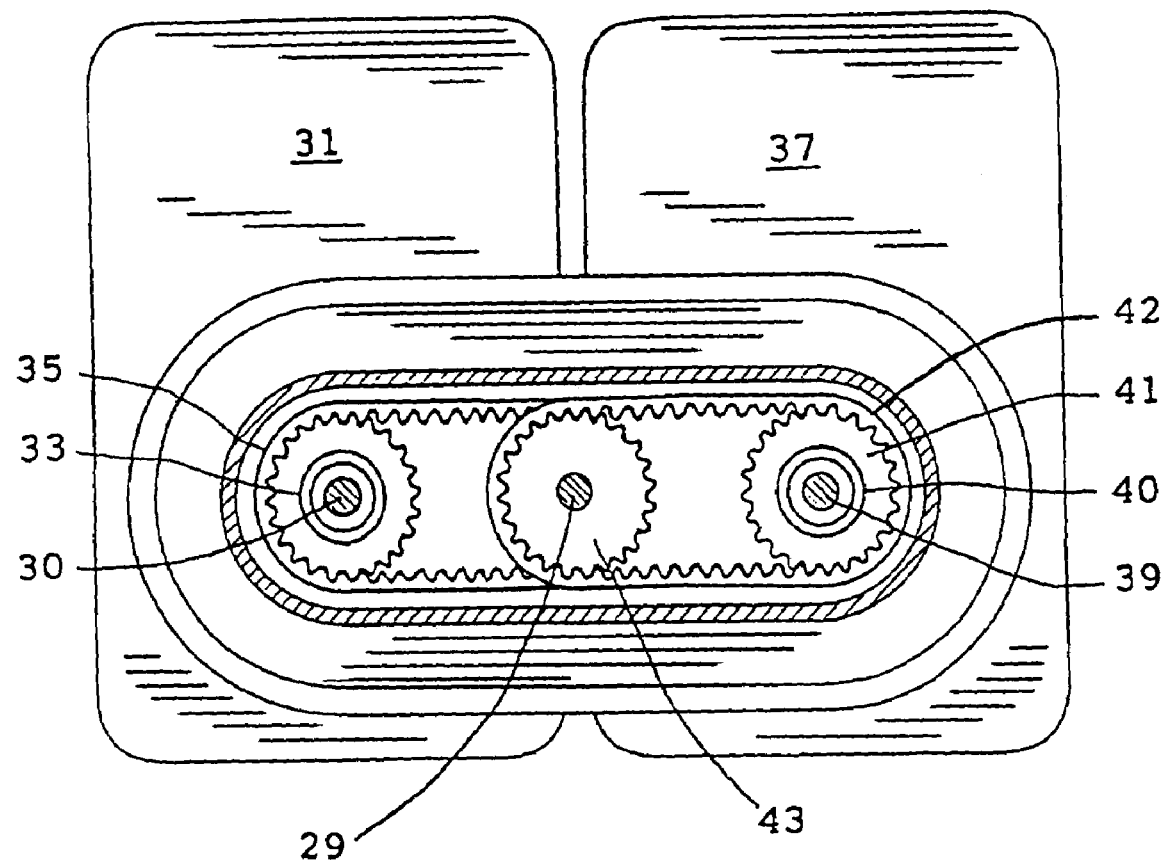
FIG. 4 is a sectional view along line 4-4 of FIG. 3.
Figure 5:
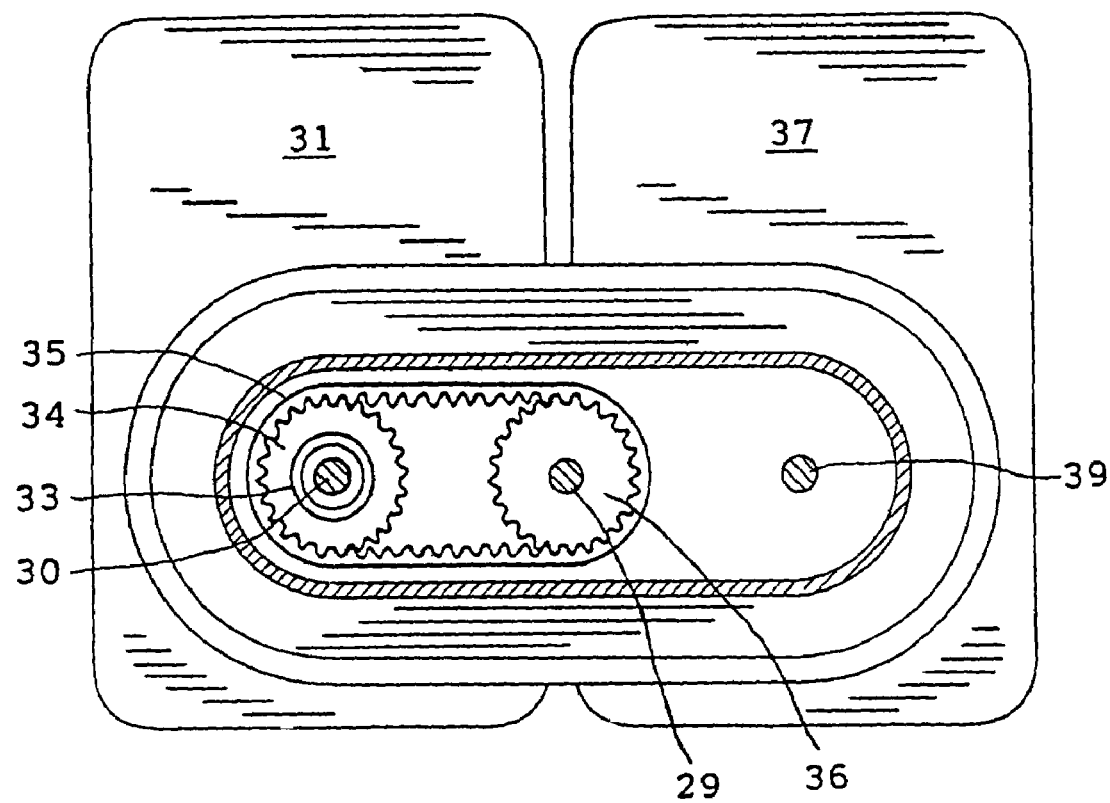
FIG. 5 is a sectional view along line 5-5 of FIG. 3.

FIGS. 3, 4 and 5 illustrate an alternative embodiment of the above-described manual transmission. In this alternative embodiment, transmission main gear 28 is mounted on common transmission input shaft 29 rather than on primary input shaft 30. Power from primary engine 31 is transmitted through primary clutch assembly 32 to primary input shaft 30 thence through primary sprag clutch 33 to primary drive sprocket 34 and primary gearing chain 35, to primary driven sprocket 36 which is fixedly mounted on common transmission input shaft 29. Sprag clutch 33 automatically engages when the rotational speed of primary input shaft 30 exceeds the rotational speed of primary drive sprocket 34, such as when there is a load carried by common transmission shaft 29. Sprag clutch 33 automatically disengages when the rotational speed of primary input shaft 30 falls below the rotational speed of primary drive sprocket 34, such as when primary engine 31 is slowed down to idle speed.

Power from secondary engine 37 is transmitted through secondary clutch assembly 38 to secondary input shaft 39 thence through secondary sprag clutch 40 to secondary drive sprocket 41 and secondary gearing chain 42 to secondary driven sprocket 43 which is fixedly mounted on common transmission input shaft 29. Primary engine 31 and secondary engine 37 are disposed so that their crankshafts 44 and 45 turn in the same direction. During high load situations when both primary engine 31 and secondary engine 37 are operated at full operational speeds, primary sprag clutch 33 and secondary sprag clutch 40 automatically engage as soon as clutch assemblies 32 and 38 are engaged, thereby delivering the combined power from engines 31 and 37 to common transmission input shaft 29, thence through transmission main gear 28 to speed change transmission gears within gearbox 46.

During light load situations either primary engine 31 or secondary engine 37 may be throttled down to idle speed, whereupon its corresponding associated sprag clutch 33 or 40 will automatically decouple it from the common transmission input shaft 29. In this embodiment, therefore, the vehicle can travel economically at cruising speed on power from either primary engine 31 or secondary engine 37 by simply throttling down the other engine by means of controlled fuel supply.

Figure 6:
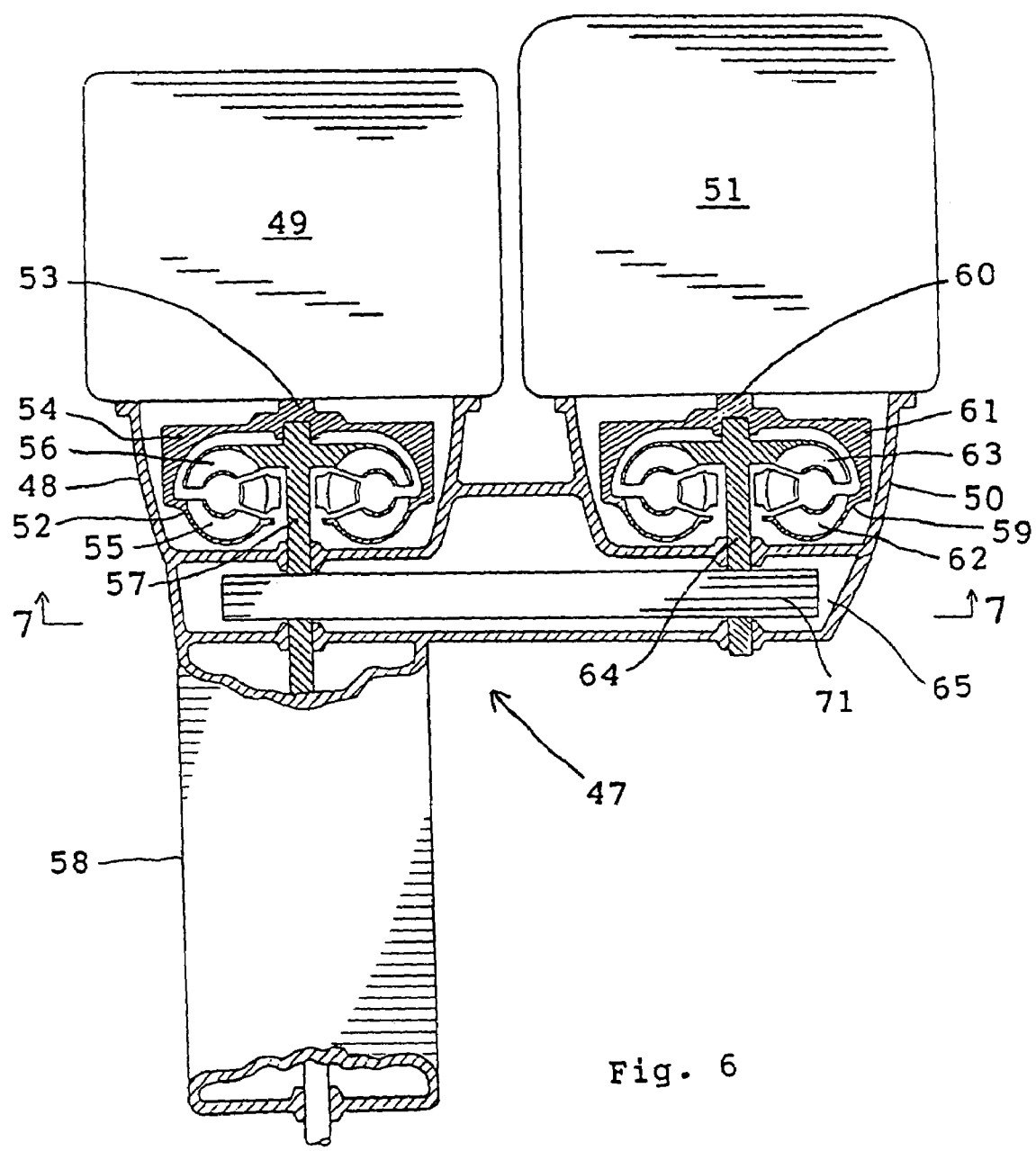
FIG. 6 is a top view, partly in section, of an automatically operated embodiment of the transmission of this invention.
Figure 7:
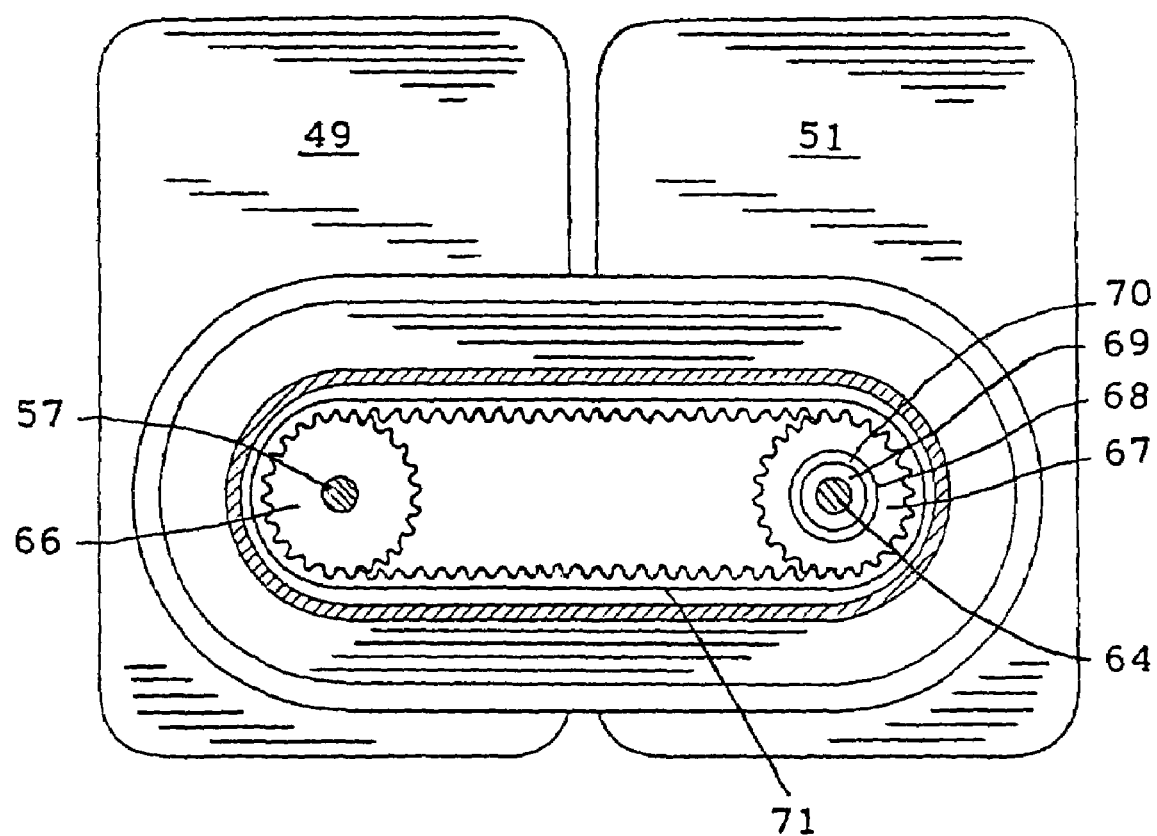
FIG. 7 is a sectional view taken along line 7-7 of FIG. 6.

FIGS. 6 and 7 illustrate an embodiment of the transmission of this invention which is automatically operated. Automatic transmission 47 has a primary bell housing 48 bolted to primary engine 49 and a secondary bell housing 50 bolted to secondary engine 51. Primary bell housing 48 houses primary torque converter 52 which transmits power from primary engine crankshaft 53 through primary flywheel 54 and impeller 55 via a fluid coupling to turbine 56 joined to primary input shaft 57 which extends into a gear system within housing 58.

Secondary bell housing 50 houses secondary torque converter 59 which transmits power from secondary engine crankshaft 60 through secondary engine flywheel 61 and impeller 62, via a fluid coupling to turbine 63 joined to secondary input shaft 64. Aside from having two torque converters 52 and 59, this embodiment also has the novel feature of integrating primary bell housing 48 and secondary bell housing 50 into one unit, either by being cast in one piece or by being fixedly bolted together. Furthermore, bell housings 48 and 50 include a common power transmission chamber 65 which is traversed by both primary input shaft 57 and secondary input shaft 64 which are each journaled to the walls of chamber 65.

Driven sprocket wheel 66 is fixedly mounted on primary input shaft 57, while driver sprocket wheel 67 is releasably mounted on secondary input shaft 64 through sprag clutch 68 which has its inner race 69 fixedly connected to secondary input shaft 64, and its outer race 70 fixedly attached to drive sprocket wheel 67. Driven sprocket wheel 66 is interactive with drive sprocket wheel 67 by way of a positive drive means embodied by gearing chain 71. Sprag clutch 68 automatically engages whenever secondary engine 51 is operated fast enough to contribute additional power to primary input shaft 57 such as during operations when increased power is required, and disengages automatically when secondary engine 51 is slowed down to idle speed to conserve fuel during operations when less power is needed.

Figure 8:
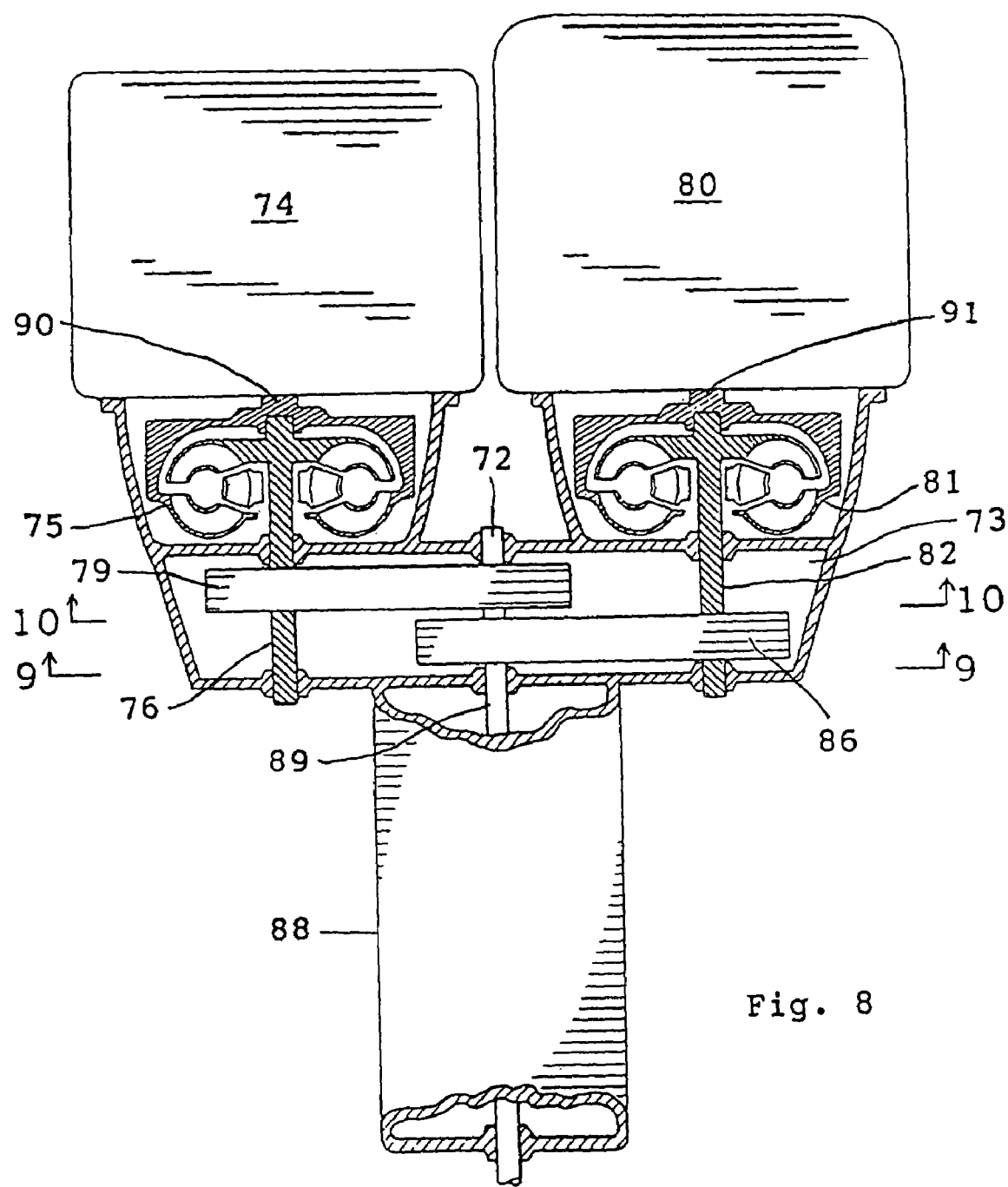
FIG. 8 is a top view, partly in section, of an alternative embodiment of an automatic transmission shown in operative association with two internal combustion engines.
Figure 9:
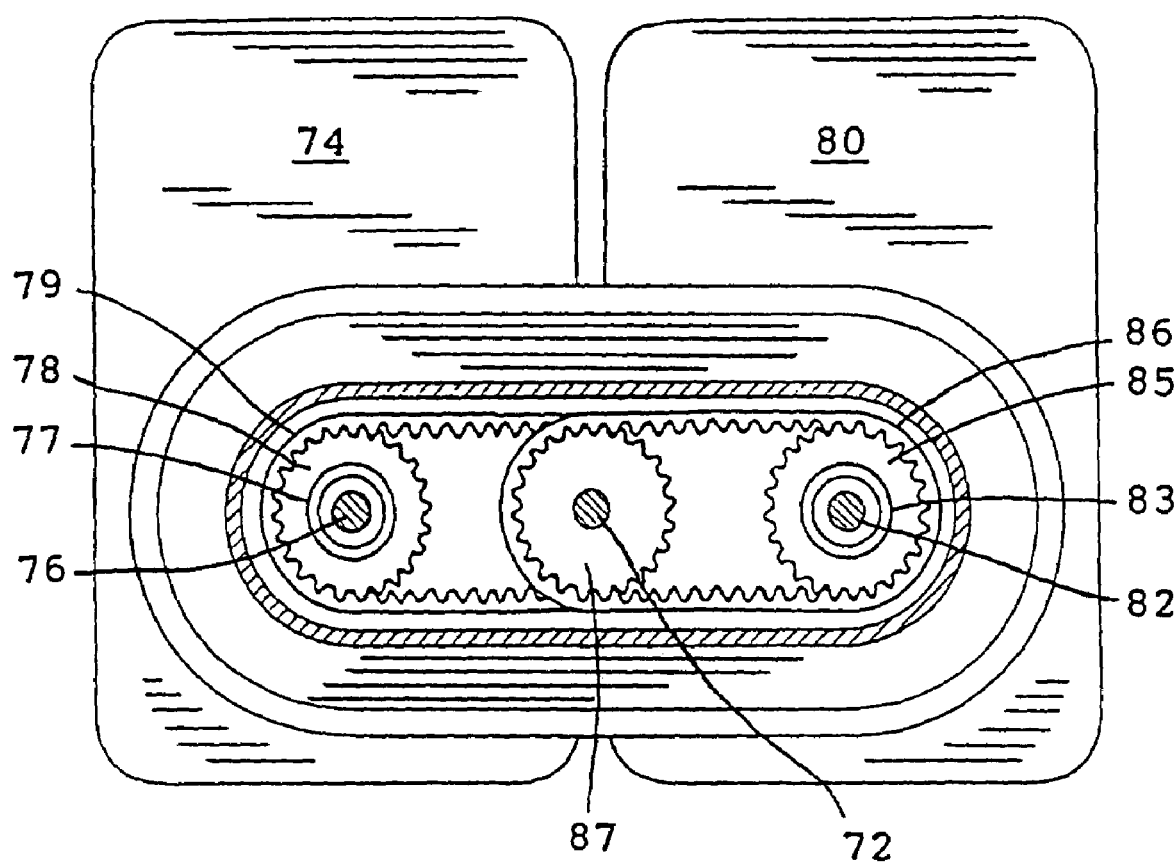
FIG. 9 is a sectional view along line 9-9 of FIG. 8.
Figure 10:
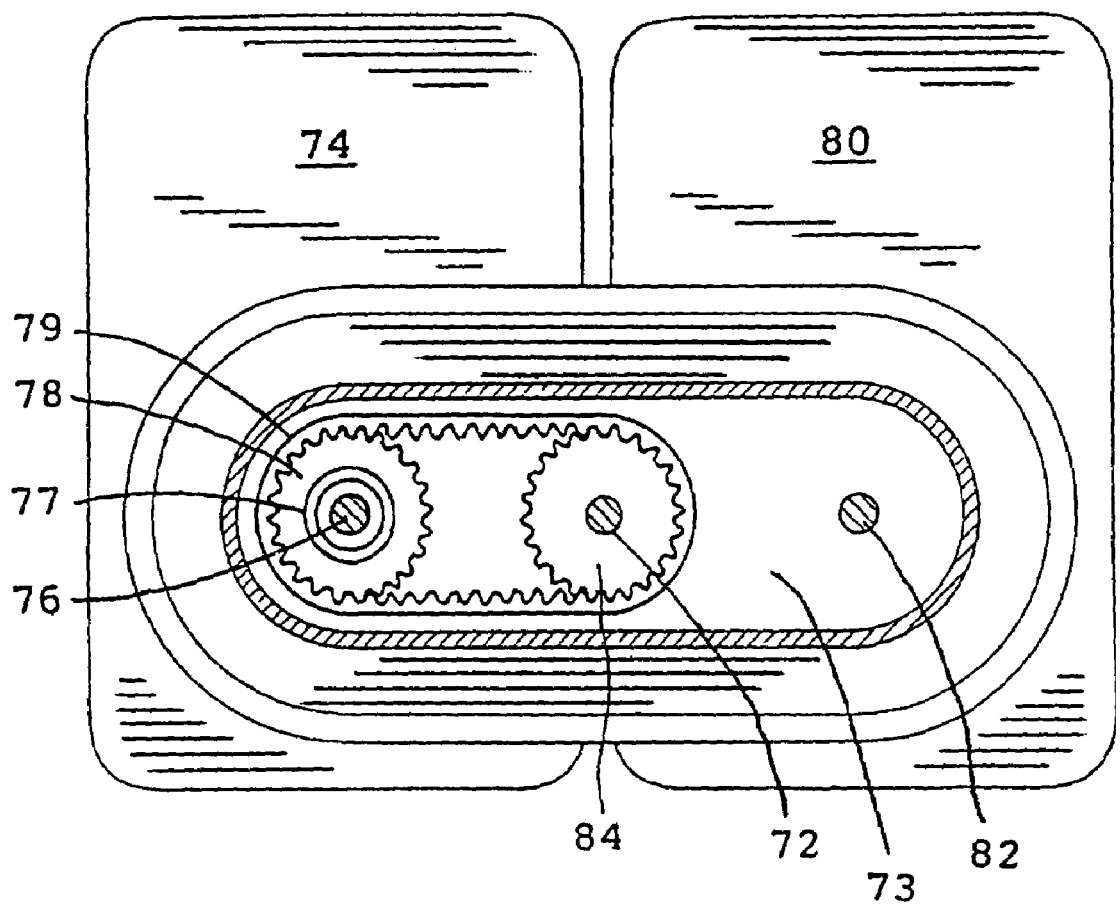
FIG. 10 is a sectional view along line 10-10 of FIG. 8.

FIGS. 8, 9 and 10 illustrate an alternative embodiment of an automatic transmission embodying the invention. This embodiment features a common transmission input shaft 72 journaled to the walls of power transmission chamber 73. Power from primary engine 74 is transmitted through primary fluid torque converter 75 to primary input shaft 76 thence through primary sprag clutch 77 to primary drive sprocket 78 and primary gearing chain 79 thence to primary driven sprocket 84 which is fixedly mounted on common input shaft 72. Similarly, power from secondary engine 80 is transmitted through secondary fluid torque converter 81 to secondary input shaft 82 thence through secondary sprag clutch 83 to secondary drive sprocket 85 and secondary gearing chain 86, thence to secondary driven sprocket 87 fixedly mounted on common input shaft 72. Said shaft 72 extends into the main automatic transmission housing 88 as the main transmission shaft 89 which drives a speed change planetary gear system housed within housing 88.

Engines 74 and 80 are disposed so that their crankshafts, 90 and 91, respectively, rotate in the same direction while in operation. When increased power is needed both engines 74 and 80 are operated at high enough speeds to supply the required power. Power from each said engine is transmitted by torque converters 75 and 81 to input shafts 76 and 82, thence through sprag clutches 77 and 83, drive sprockets 78 and 85, gearing chains 79 and 86 and driven sprockets 84 and 87 to common input shaft 72, thence to a planetary gear system within housing 88. When less is needed, either engine may be throttled down to idle speed to conserve fuel, causing the selected engine to be automatically de-coupled from the transmission by its associated sprag clutch. The advantage of this alternative embodiment is that it gives the operator a choice as to which engine to use for traveling economically at cruising speeds.

The system for controlling the fuel supply to the engines automatically, as described hereinabove with respect to manual transmissions can also be applied to the embodiment involving an automatic transmission. For example, the fuel supply to both engines may be controlled through one gas pedal calibrated to operate both engines at equal speeds when the automatic transmission is in the lower gears, and further provided with means for automatically switching either engine to "idle" speed whenever the transmission shifts to high gear. Furthermore, means may be provided for automatically switching the "idling" engine back to operational speed through the use of suitable "load sensors" or "torque sensors" when it is sensed that more power is needed, or simply whenever the operator asks for more power by depressing the gas pedal. These control mechanisms make this vehicle essentially as simple to operate as any regular vehicle equipped with a single engine.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. In an automotive vehicle having two internal combustion engines for achieving fuel economy, including a primary engine that operates during all motion of the vehicle, and a secondary engine adapted to operate intermittently, said engines separately supplied with fuel and having crankshafts in parallel orientation and terminating in co-directionally rotating power output means, an improved transmission system comprising:
   a) a transmission housing having left and right bell housings to which said engines are separately bolted, and into which said power output means extend, and a power transmission chamber positioned rearwardly of said bell housings and interactive therebetween,
   b) clutch means located within each bell housing and interactive with said separate power output means,
   c) an input shaft associated with each clutch means for receiving rotary force therefrom, and extending rearwardly through said power transmission chamber,
   d) power transfer means positioned within said power transmission chamber for transferring power laterally between said input shafts, and for transferring power rearwardly through said chamber,
   e) a sprag clutch interactive between the input shaft of said secondary engine and said power transfer means to add driving force to said power transfer means when the rotational speed of said secondary engine is equal to or greater than the rotational speed of said primary engine,
   f) a main gear affixed to said power transfer means rearwardly of said power transmission chamber, and
   g) a gear box interactive with said main gear and having speed change gears.

2. The improved transmission system of claim 1 wherein said clutch means are friction clutches manually controlled by way of pedal means manipulated by the operator of the vehicle.

3. The improved transmission system of claim 1 wherein said clutch means are automatically controlled by hydraulic components.

4. The improved transmission system of claim 1 wherein said power transfer means is comprised of a drive chain and interactive sprocket wheels orthogonally attached to said input shafts.

5. The improved transmission system of claim 1 wherein said main gear is mounted upon the input shaft of said primary engine.

6. The improved transmission system of claim 1 wherein said main gear is centrally located between said input shafts and is driven by separate power transfer means interactive between said main gear and said input shafts.

7. The improved transmission system of claim 1 wherein said power output means are comprised of flywheels.

8. The improved transmission system of claim 7 wherein said flywheels are in coplanar disposition.

9. An automotive vehicle having two internal combustion engines coupled to the transmission system of claim 1.

10. The vehicle of claim 9 wherein said coupling involves manual control means.

11. The vehicle of claim 9 wherein said coupling involves automatic control means.

12. The vehicle of claim 9 further equipped with an accelerator pedal and interactive fuel supply means which feeds fuel to said secondary engine when additional power is needed by said vehicle.

13. The improved transmission system of claim 1 wherein said bell housings are substantially integral features of said transmission housing.

* * * * *